US010884273B1

(12) United States Patent
Xiao et al.

(10) Patent No.: US 10,884,273 B1
(45) Date of Patent: Jan. 5, 2021

(54) DISPLAY PANEL COMPRISING A PHOTOSENSITIVE COMPONENT THAT RECEIVES REFLECTED LIGHT OF A FINGERPRINT AND IS CONNECTED TO AN UNDERSIDE OF A SECOND THIN FILM TRANSISTOR LAYER AND DISPLAY DEVICE

(71) Applicant: WUHAN CHINA STAR OPTOELECTRONICS TECHNOLOGY CO., LTD., Wuhan (CN)

(72) Inventors: Juncheng Xiao, Wuhan (CN); Fei Ai, Wuhan (CN); Yuan Yan, Wuhan (CN)

( * ) Notice: Subject to any disclaimer, the term of this patent is extended or adjusted under 35 U.S.C. 154(b) by 0 days.

(21) Appl. No.: 16/642,029

(22) PCT Filed: Nov. 7, 2019

(86) PCT No.: PCT/CN2019/116128
§ 371 (c)(1),
(2) Date: Feb. 26, 2020

(30) Foreign Application Priority Data

Sep. 5, 2019 (CN) .......................... 2019 1 0838238

(51) Int. Cl.
*G02F 1/133* (2006.01)
*G02F 1/1333* (2006.01)
*G02F 1/1362* (2006.01)

(52) U.S. Cl.
CPC ...... *G02F 1/13318* (2013.01); *G02F 1/13338* (2013.01); *G02F 1/136209* (2013.01); *G02F 1/136227* (2013.01); *G02F 2001/13312* (2013.01)

(58) Field of Classification Search
CPC ............ G02F 1/13318; G02F 1/13392; G02F 2001/13312; G02F 2001/13685; H01L 27/14678
See application file for complete search history.

(56) References Cited

U.S. PATENT DOCUMENTS

| | | | |
|---|---|---|---|
| 2009/0002341 A1 | 1/2009 | Saito | |
| 2012/0242636 A1* | 9/2012 | Yuki | G06F 3/0412 345/207 |
| 2017/0161544 A1* | 6/2017 | Fomani | G01J 1/08 |
| 2017/0255308 A1 | 9/2017 | Li et al. | |
| 2017/0277356 A1* | 9/2017 | Hsieh | G06F 3/042 |
| 2018/0068166 A1* | 3/2018 | Zeng | A61B 5/1172 |

(Continued)

FOREIGN PATENT DOCUMENTS

| | | |
|---|---|---|
| CN | 105467644 A | 4/2016 |
| CN | 105514119 A | 4/2016 |

(Continued)

*Primary Examiner* — Paul C Lee (57) ABSTRACT

A display panel and a display device are provided, which the display panel including a display substrate, a counter substrate, and a backlight. The display substrate includes a first thin film transistor layer, a touch electrode, and a pixel definition layer. The substrate includes a second thin film transistor layer and a photosensitive component. The second thin film transistor layer has a plurality of thin film transistors. The photosensitive component is connected to an underside of the second thin film transistor layer. The photosensitive component receives a reflected light of a user's fingerprint to identify an identification of the user.

10 Claims, 5 Drawing Sheets

(56) References Cited

U.S. PATENT DOCUMENTS

2018/0076256 A1* 3/2018 Jiang .................. H01L 27/127
2018/0357462 A1* 12/2018 Mackey ................ G06F 1/1684

FOREIGN PATENT DOCUMENTS

| CN | 110045534 A | 7/2019 |
| CN | 110061044 A | 7/2019 |
| JP | 2008305154 A | 12/2008 |

* cited by examiner

DISPLAY PANEL COMPRISING A PHOTOSENSITIVE COMPONENT THAT RECEIVES REFLECTED LIGHT OF A FINGERPRINT AND IS CONNECTED TO AN UNDERSIDE OF A SECOND THIN FILM TRANSISTOR LAYER AND DISPLAY DEVICE

FIELD OF INVENTION

The present disclosure relates to the field of displays, and in particular, to a display panel and a display device.

BACKGROUND OF INVENTION

Fingerprint recognition as a biometric recognition method has recently attracted widespread attention, especially in mobile payment. Many methods of fingerprint recognition have also been invented, such as optical, capacitive, microwave, temperature, and ultrasonic. However, each approach has its advantages and disadvantages. For example, the traditional optical sensor method cannot achieve thinness and light weight, especially in the case of high resolution, the conventional device is bulky and cannot be portable, so it is difficult to integrate into a device such as a mobile phone. Although other methods solve the problem of thinness and light weight, they cannot realize a larged-area array, or cannot combine other functions, and the process is complicated and costly.

In the conventional art, a medical use of amorphous silicon flat panel detector is a conventional optical sensor, including an amorphous silicon photodiode and a thin film transistor, which working principle is: adding a negative voltage between −3V and −9V on an anode of the amorphous silicon photodiode, that is, a P-type layer, the amorphous silicon photodiode generates electron-hole pairs when light signal is incident on the amorphous silicon photodiode. Under the action of an electric field, the holes converge on the anode P-type layer, and the electrons converge to a cathode N-type layer. When the thin film transistor is turned off, the signal is continuously accumulated, and when the thin film transistor is turned on, the electric charge is output to the data line. The strength of the optical signal is determined according to the magnitude of the detected amount of charge signal.

Generally, the fingerprint sensor is an optical fingerprint recognition sensor, which requires independent optical path and circuit support, and has a great influence on an array process technology and an aperture ratio of the display substrate. At present, the fingerprint sensor is usually an optical diffuse reflection method. In the process of fingerprint recognition, after the light source shines on the finger, the light beam is diffusely reflected by the finger, and a trough of the finger fingerprint (hereinafter referred to as valley) and a peak (hereinafter referred to as the ridge) are diffusely reflected with different light energy. The light energy of the valley is lower than the light energy of the ridge, and thus the difference is used for fingerprint recognition. However, the divergence of the divergent light reflected by the valleys and ridges of the finger fingerprint is poor and the difference in light energy is extremely small, and there is also interference of ambient light between the valleys and the ridges of the finger fingerprint, so it is difficult to accurately perform the fingerprint recognition. In addition, the fingerprint sensor is affected by twice absorption of the liquid crystal, and sensitivity of fingerprint recognition is greatly attenuated.

Technical Problem

The purpose of the present disclosure is to provide a display panel and a display device to solve the technical problem that the fingerprint sensor existing in the conventional art affects the array process technology, the aperture ratio of the display panel, and sensitivity of fingerprint recognition is lower.

SUMMARY OF INVENTION

Technical Solution

The present disclosure provides a display panel including a display substrate; a counter substrate disposed opposite to the display substrate; and a backlight including a detecting light source disposed under the display substrate; wherein the display substrate includes a first thin film transistor layer having a plurality of thin film transistors; a touch electrode disposed on a surface of a side of the first thin film transistor layer; and a pixel definition layer disposed on a surface of the touch electrode and on the surface of the first thin film transistor layer, wherein the pixel definition layer includes a plurality of pixel regions, and each of the pixel regions is correspondingly disposed on one of the plurality of thin film transistors; and the counter substrate includes a second thin film transistor layer having a plurality of thin film transistors; and a photosensitive component connected to an underside of the second thin film transistor layer; wherein the photosensitive component is configured to receive a reflected light of a fingerprint of a user to identify an identification of the user.

Further, the photosensitive component includes a cathode disposed on a surface of a side of the second thin film transistor layer; an electron transport layer disposed on a surface of a side of the cathode away from the second thin film transistor layer; a photosensitive layer disposed on a surface of a side of the electron transport layer away from the second thin film transistor layer; a hole transport layer disposed on a surface of a side of the photosensitive layer away from the second thin film transistor layer; and an anode disposed on a surface of a side of the hole transport layer away from the second thin film transistor layer.

Further, the second thin film transistor layer includes a first gate insulating layer, a first gate, a second gate insulating layer, a first active layer, and a first source-drain laminated in a stack;

wherein the photosensitive layer in the photosensitive component is connected to a side of the anode through the hole transport layer, and the first source-drain is connected to the other side of the anode; and wherein the photosensitive layer in the photosensitive component is connected to the cathode through the electron transport layer.

Further, the counter substrate further includes: a first substrate; black matrix patterns disposed on a surface of a side of the first substrate; a first passivation layer disposed on a surface of a side of the second thin film transistor layer away from the first substrate; and a first planarization layer disposed on a surface of a side of the photosensitive component and on a surface of a side of the first passivation layer away from the first substrate; wherein the second thin film transistor layer is disposed on surfaces of sides of the black matrix patterns and on the surface of the side of the first substrate.

Further, a detection light is emitted from the detecting light source, irradiating onto the fingerprint of the user through the display panel, and reflected by the fingerprint to form a reflected light when the user touches the display panel; and the photosensitive component acquires the reflected light, and recognizes a pattern of the fingerprint of the user according to intensity differences of the reflected light.

Further, the display panel further includes a liquid crystal layer disposed between the display substrate and the counter substrate; wherein the first thin film transistor layer is configured to provide a driving voltage for the liquid crystal layer; and wherein the second thin film transistor layer is configured to provide a driving current to the photosensitive component.

Further, the display substrate further includes a second planarization layer disposed on a surface of a side of the pixel definition layer away from the first thin film transistor layer; a common electrode disposed on a surface of a side of the second planarization layer away from the first thin film transistor layer and connected to the touch electrode; a second passivation layer disposed on a surface of a side of the common electrode and the surface of the side of the second planarization layer away from the first thin film transistor layer; a via hole penetrating through the second passivation layer, the second planarization layer, and the pixel definition layer, wherein a position of the via hole corresponds to a position of a second source-drain; and a pixel electrode filled in the via hole and connected to the second source-drain.

Further, the first thin film transistor layer includes a second active layer, a third gate insulating layer, a third gate, a third gate insulating layer, a dielectric layer, and a second source-drain laminated in a stack.

Further, the display substrate further includes a second substrate; light-shielding patterns disposed on a surface of a side of the second substrate; and a buffer layer disposed on surfaces of sides of the light-shielding patterns and the surface of the side of the second substrate; wherein the first thin film transistor layer is disposed on a surface of a side of the buffer layer away from the second substrate.

To achieve the above object, the present disclosure also provides a display device including the display panel described above.

Beneficial Effect

The technical effect of the present disclosure is to provide a display panel and a display device, which adopts a color filter on array process on the display substrate. It can solve the problem that it is difficult to integrate the in-cell fingerprint sensing array in the liquid crystal display products, and increases the aperture ratio of the display panels. The photosensitive component is disposed on the light-emitting surface of the counter substrate, thereby shortening the distance between the photosensitive component and the finger fingerprint, shortening the path of the light, and reducing the loss of reflected light of the fingerprint. Thereby, the sensitivity of fingerprint recognition of the display panel is improved, and the fingerprint recognition under the in-cell screen of the liquid crystal display panel is realized, which can provide a better unlocking experience for people.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

1, backlight; 2, display substrate; 3, liquid crystal layer; 4, counter substrates; 10, photosensitive components; 20, via hole;

21, second substrate; 22, light-shielding pattern; 23, buffer layer; 24, first thin film transistor layer; 25, touch electrode;

26, pixel definition layer; 27, second planarization layer; 28, common electrode; 29, second passivation layer; 30, pixel electrode;

41, first substrate; 42, black matrix pattern; 43, second thin film transistor layer; 44, cathode;

45, electron transport layer; 46, photosensitive layer; 47, hole transport layer; 48, anode;

49, first passivation layer; 50, first planarization layer; 51, support pillar;

241, second active layer; 242, second gate insulating layer; 243, second gate;

244, third gate insulating layer; 245, dielectric layer; 246, second source-drain;

431, first gate insulating layer; 432, first gate; 433, second gate insulating layer;

434, first active layer; 435, first source-drain.

DETAILED DESCRIPTION OF EMBODIMENTS

The preferred embodiments of the present disclosure are described below with reference to the accompanying drawings, which are used to exemplify the disclosure. The technical content of the present disclosure makes the technical content of the present disclosure clearer and easier to understand. However, the present disclosure can be embodied in many different forms of embodiments, and the scope of the disclosure is not limited to the embodiments mentioned herein.

An embodiment of the present invention provides a display panel, which realizes optical fingerprint recognition through a display substrate and a counter substrate, and the display substrate is a color filter on array (COA) which adopts a technique of color film on array, an aperture ratio of display substrate can be increased. Moreover, the photosensitive component is disposed on the counter substrate, which can accurately recognize the divergence of valleys and ridges of the finger fingerprint and the difference in light energy, the fingerprint recognition effect is more accurate, and a touch function can also be realized.

Figure 1:
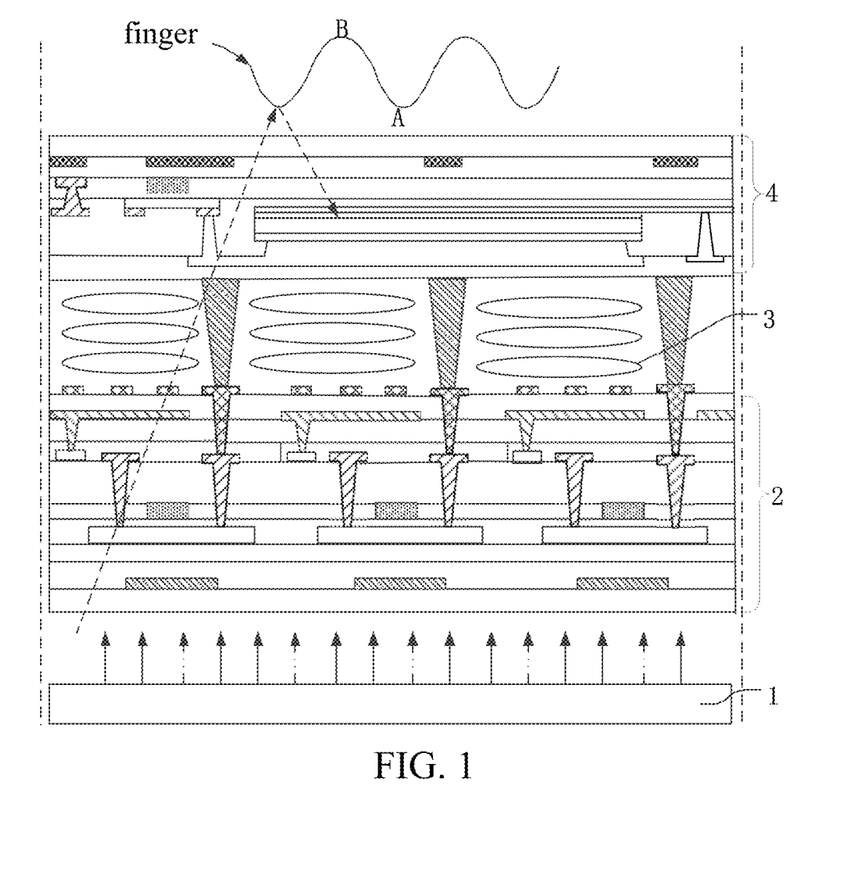
FIG. 1 is a schematic structural view of a display panel according to an embodiment of the present invention.

As shown in FIG. 1, the display panel includes a backlight 1, a display substrate 2, a liquid crystal layer 3, and a counter substrate 4. The backlight 1 is disposed under the display substrate 2, and the liquid crystal layer 3 is disposed between the display substrate 2 and the counter substrate 4 to implement fingerprint recognition and a touch function.

The backlight 1 can include an illumination source and a detecting light source that are spaced apart, the illumination source is configured to emit illumination light and the detecting light source is configured to emit detection light. In FIG. 1, solid arrows indicate illumination light, and broken lines indicate detection light. Preferably, the illumination source is a white light-emitting diode (LED), the illumination light can be white light, the detecting light source is an infrared LED, and the detection light can be infrared light.

Figure 2:
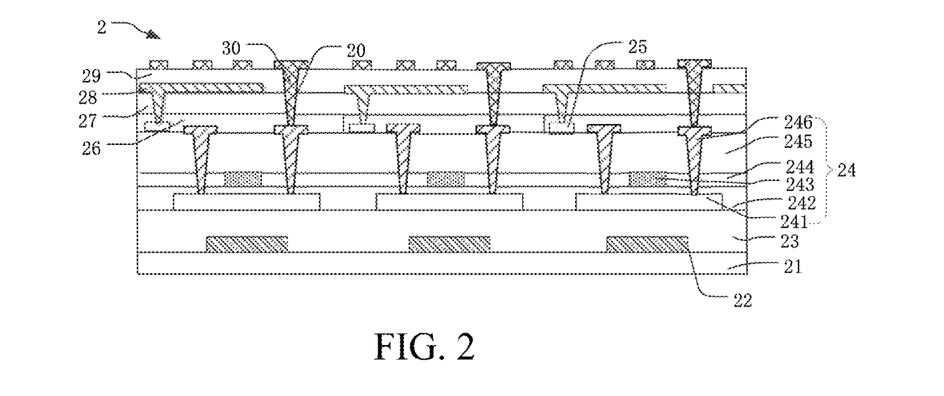
FIG. 2 is a schematic structural view of a display panel according to the embodiment of the present invention.

As shown in FIG. 2, the display substrate 2 includes a second substrate 21, light-shielding patterns 22, a buffer layer 23, a first thin film transistor layer 24, a touch electrode 25, a pixel definition layer 26, a second planarization layer 27, a common electrode 28, a second passivation layer 29, and a pixel electrode 30.

The second substrate 21 is a PI substrate and has good flexibility. The light-shielding patterns 22 are disposed at intervals on an upper surface of the second substrate 21, which has a good light-shielding effect. The buffer layer 23 is disposed on the upper surface of the second substrate 21 and the light-shielding patterns 22.

The first thin film transistor layer 24 includes a second active layer 241, a third gate insulating layer 242, a second gate 243, a fourth gate insulating layer 244, a dielectric layer 245, and a second source-drain 246. The second active layer 241 and the third gate insulating layer 242 are sequentially disposed on the upper surface of the buffer layer 23, and the second active layer 241 includes a P-type silicon material and an N-type silicon material. The first gate electrode 243 is disposed on an upper surface of the third gate insulating layer 242 and opposite to the second active layer 241. The dielectric layer 245 and the fourth gate insulating layer 244 are sequentially disposed on an upper surface of the first gate 243. The second source-drain 246 is disposed on an upper surface of the dielectric layer 245 and is connected to both ends of the second active layer 241. The dielectric layer 245 and the fourth gate insulating layer 244 are provided with first via holes, and the second source-drain 246 fills the first via holes and is connected to the second active layer 241.

The touch electrode 25 includes a plurality of touch signal lines disposed in same layer as the second source-drain 246. The touch electrode 25 and the second source-drain 246 are made of same material and are formed in a same mask process.

The pixel definition layer 26 is disposed on an upper surface of the touch electrode 25 and the first thin film transistor layer 24. The pixel definition layer 26 has a plurality of pixel regions, and each of the pixel regions is correspondingly disposed on a thin film transistor. The pixel definition layer 26 includes a plurality of color sub-pixel regions arranged in sequence, for example, the color sub-pixel regions can include red sub-pixel regions, green sub-pixel regions, or blue sub-pixel regions. It should be understood that the thin film transistor is equivalent to a drive switch that controls sub-pixel regions illumination in the pixel definition layer 26 to implement the COA array, increasing the aperture ratio of the display panel.

The second planarization layer 27 is disposed on an upper surface of the pixel definition layer 26. The common electrode 28 is disposed on an upper surface of the second planarization layer 27, and the second planarization layer 27 and the pixel definition layer 26 are provided with second through holes, the common electrode 28 is electrically connected to the touch electrode 25 through the second through holes. The second passivation layer 29 is disposed on an upper surface of the common electrode 28 and the second planarization layer 27. The material of the second passivation layer 29 includes, but is not limited to, silicon oxide and silicon nitride, which has a good insulating effect. The via holes 20 penetrate through the second passivation layer 29, the second planarization layer 27, and the pixel definition layer 26. Positions of the via holes 20 correspond to positions of the second source-drain 246. The pixel electrode 30 fills the via holes 20 and is electrically connected to the second source-drain 246. The material of the pixel electrode 30 includes, but is not limited to, ITO.

The display substrate is a color filter on array (COA) substrate, using a technique of color film on array, which can increase the aperture ratio of the display panel.

Figure 3:
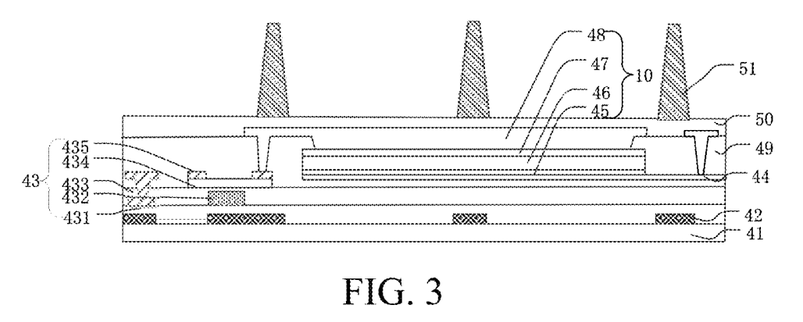
FIG. 3 is a schematic structural view of a counter substrate according to an embodiment of the present invention.

As shown in FIG. 3, the counter substrate 4 includes a first substrate 41, black matrix patterns 42, a second thin film transistor layer 43, a photosensitive component 10, a first passivation layer 49, a first planarization layer 50, and support pillars 51. Meanwhile, the photosensitive component 10 includes a cathode 44, an electron transport layer 45, a photosensitive layer 46, a hole transport layer 47, and an anode 48.

The black matrix patterns 42 are disposed at intervals on an upper surface of the first substrate 41 and opposite to the light-shielding patterns 22, so that a better light-shielding effect can be obtained. The light-shielding patterns 22 block the transmission of the illumination light to the photosensitive component 10, and the detection light can be transmitted to a fingerprint through the light-shielding patterns 22. The black matrix patterns 42 can allow the detection light to pass, preventing the illumination light from passing, thereby making the display panel have a good display effect and improving the touch sensitivity of the display panel.

The second thin film transistor layer 43 is disposed on the black matrix patterns 42 and the upper surface of the first substrate 41. The second thin film transistor layer 43 includes a plurality of thin film transistors, each of the thin film transistors includes a first gate insulating layer 431, a first gate 432, a second gate insulating layer 433, a first active layer 434, and a first source-drain 435.

The first gate insulating layer 431 is disposed on upper surfaces of the black matrix patterns 42, the first gate 432 is disposed on an upper surface of the first gate insulating layer 431, and the second gate insulating layer 433 is disposed on an upper surface of the first gate 432. The first active layer 434 is disposed on an upper surface of the second gate insulating layer 433 and is disposed opposite to the first gate 432. The material of the first active layer 434 includes, but is not limited to, IGZO. The first source-drain 435 is disposed at both ends of the first active layer 434.

The photosensitive component 10 is a photodiode, which is a PIN type photodiode, and the PIN type photodiode is also called a PIN junction diode or a PIN diode. A size of the photosensitive device is in an order of micrometers, the single photosensitive device is smaller than a size of the valley and ridge of the finger, and has the characteristics of short transit times and high sensitivity.

The photosensitive component 10 includes the cathode 44, the electron transport layer 45, the photosensitive layer 46, the hole transport layer 47, and the anode 48 in this order from a top to a bottom. The cathode 44 is disposed on an upper surface of the second thin film transistor layer 43. Specifically, the cathode 44 is disposed on the upper surface of the second gate insulating layer 433 and is disposed in same layer as the first active layer 434. The electron transport layer 45, the photosensitive layer 46, and the hole transport layer 47 are sequentially disposed on an upper surface of the cathode 44. The anode 48 is disposed on an upper surface of the hole transport layer 47 and is electrically connected to the first source-drain 435. The first passivation layer 49 is disposed on upper surfaces of the first active layer 434, the first source-drain 435, and the cathode 44.

Preferably, the photosensitive layer 46 includes a P-type silicon layer, an I-type layer, and an N-type silicon layer which are sequentially disposed. The P-type silicon layer is formed by mixing SiH4 and B2H6, and an intrinsic layer is formed by SiH4 or a mixture of SiH4 and H2, and the N-type silicon layer is formed by mixing SiH4, PH3, and H2. In the fabricating process, the P-type silicon layer, the I-type layer, and the N-type silicon layer are respectively formed by printing, and images formed by printing are more precise and accurate. An PIN photodiode as a photosensitive component, when it is exposed to light, the resistance is decreased, and the current is increased. Moreover, the stronger the light intensity, the smaller the resistance. Based on this principle, the light intensity of the valley and ridge of the fingerprint is discriminated. A position corresponding to the reflected light with a high light intensity is the ridge of the fingerprint, and a position corresponding to the reflected light with a low light intensity is the valley of the fingerprint. Therefore, the photosensitive element 10 can acquire the pattern of the fingerprint.

The first planarization layer 50 is disposed on upper surfaces of the anode 48 and the first passivation layer 49. The support pillars 51 are disposed at intervals on an upper surface of the first planarization layer 50 and are connected to the pixel electrode 30. In this embodiment, the support pillars 51 are disposed in a gap of the liquid crystal layer 3 for supporting the liquid crystal layer 3 to ensure uniform distribution of liquid crystal molecules in the liquid crystal layer 3.

In the conventional art, those skilled in the art set the photosensitive component in the display substrate such that the photosensitive component is close to a side of the light source (light incident surface). This will make a distance between the photosensitive element and the fingerprint of the finger far longer, which will cause the scattering of the reflected light to be more serious, and the light may be reflected by the opposite substrate to the photosensitive element. As a result, the light source received by the photosensitive element is not clear, which seriously affects the touch performance of the display panel. However, in the display panel provided in present embodiment, the photosensitive component is disposed on the light-emitting surface of the counter substrate, which can shorten the distance between the photosensitive component and the finger fingerprint, reduce light scattering, and reduce light refraction of the structure of the counter substrate. The sensitivity of fingerprint recognition of the display panel is made.

In an operation of the display panel, the first thin film transistor layer is configured to provide a driving voltage for the liquid crystal layer, so that the display panel realizes the display effect. In addition, the thin film transistor in the first thin film transistor layer can drive the touch electrode to work to make the display panel having a touch function. The thin film transistor in the second thin film transistor layer is equivalent to a control switch, and is configured to provide a driving current for the photosensitive component. When a user touches the display panel, a detection light is emitted from the detecting light source, irradiating onto the fingerprint of the user through the display panel, and reflected by the fingerprint to form a reflected light. The photosensitive component acquires the reflected light, and recognizes a pattern of the fingerprint of the user according to intensity differences of the reflected light. The display panel adopts two thin film transistor layers, the first thin film transistor layer mainly realizes display and touch function, and the second thin film transistor layer realizes fingerprint recognition function, which can reduce display panel circuit failure and improve user's experience.

As shown in FIG. 1, a finger includes a ridge position A and a valley position B. When the finger touches, the detection light emitted from the backlight 1 is irradiated onto the finger through the display panel, and the light reflected by the finger fingerprint is reflected to the photodiode. The photodiode converts the reflected light into a current signal and outputs a current signal to a signal output line through an opened thin film transistor in second thin film transistor layer. The signal output line outputs the current signal, which can be used to determine a position at which the touch action occurs is the valley position or the ridge position. Since there is a difference between the ridge position A of the finger and the valley position B, the light intensity of the reflected light reflected by the ridge position A and the valley position B is different. When the reflected light of different light intensities is irradiated to the photodiode, current signals generated from the photodiode are also different. Therefore, it can be determined from the difference in the current signals that the positions where the touch action occurs are the ridge position A and the valley position B. A pattern formed by a set of ridge positions A is a fingerprint pattern of the user.

The working principle of identifying the user's identification: first, the first gate is opened, a potential V1 is input to the photodiode P terminal, then the first gate is turned off, and the photodiode is in a reverse bias state at this moment. Second, when a finger is pressed against a surface of the display panel, the fingerprint of the ridge position A or the fingerprint of the valley position B reflects the reflected light to the photodiode, and photons cause the potential at a high potential of the reverse bias photodiode to decrease. Since the light intensity of the valley and the ridge is different, a degree of potential reduction is different. Third, when the first gate is turned on again, the photodiode outputs different current values due to different potential differences, which are then used to determine the position of the valley and the ridge to acquire the fingerprint pattern of the user. Finally, the photodiode feeds back the acquired fingerprint pattern to a data processing device (such as a mobile phone processor), and the data processing device compares the acquired fingerprint pattern of the user in real time with a fingerprint pattern pre-recorded in the database to determine the consistency of the feature points. Thereby identifying whether the user's identification corresponding to the fingerprint is legitimate.

The display panel provided in this embodiment, which the display substrate adopts a color filter on array (COA) process. It can solve the problem that it is difficult to integrate the in-cell fingerprint sensing array in the liquid crystal display products, and increases the aperture ratio of the display panels. The photosensitive component is disposed on the counter substrate of the light-emitting surface, thereby shortening the distance between the photosensitive component and the finger fingerprint, shortening the path of the light, and reducing the loss of reflected light of the fingerprint. Thereby, the sensitivity of fingerprint recognition of the display panel is improved, and the fingerprint recognition under the in-cell screen of the liquid crystal display panel is realized, which can provide a better unlocking experience for people.

Figure 4:
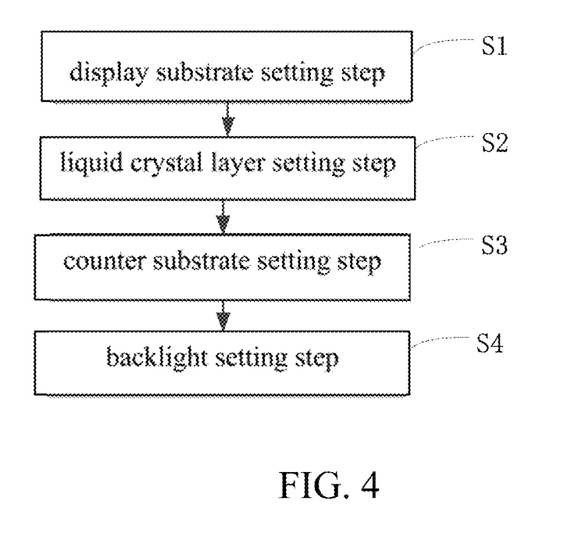
FIG. 4 is a flowchart showing the display panel according to the embodiment of the present invention.

As shown in FIG. 4, the present embodiment further provides a method of fabricating the display panel, including the following steps S1 to S4. A display substrate setting step of S1, setting the display substrate. A liquid crystal layer setting step of S2, a liquid crystal molecular material is coated on the surface of the display substrate to form the liquid crystal layer. A counter substrate setting step of S3, the counter substrate is disposed on an upper surface of the liquid crystal layer. A backlight setting step of S4, disposing the backlight under the display substrate. The backlight includes the illumination source and the detecting light source that are spaced apart, the illumination source is configured to emit the illumination light, and the detecting light source is configured to emit the detection light.

Figure 5:
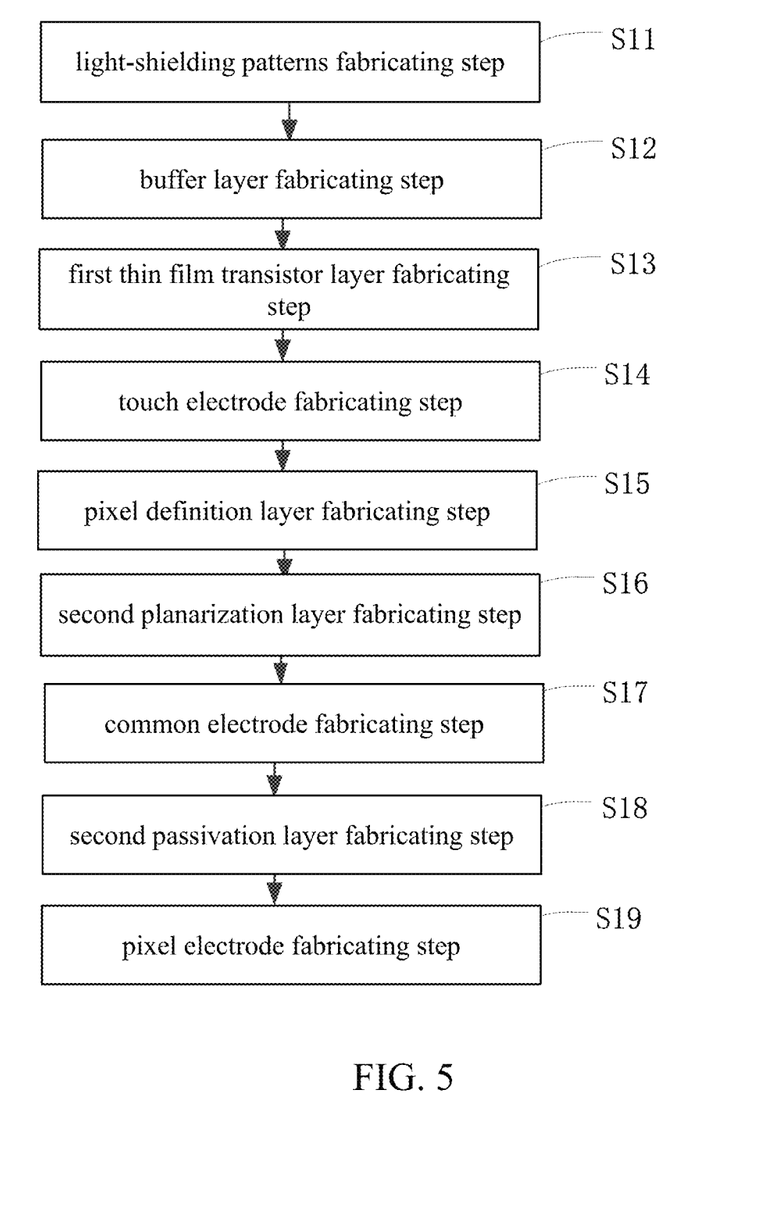
FIG. 5 is a flowchart showing steps of setting the display substrate according to the embodiment of the present invention.

As shown in FIG. 5, the display substrate setting step includes the following steps S11 to S19.

A light-shielding patterns fabricating step of S11, fabricating the light-shielding patterns at intervals on the upper surface of the first substrate.

A buffer layer fabricating step of S12, fabricating the buffer layer on the light-shielding patterns and the upper surface of the second substrate.

Figure 6:
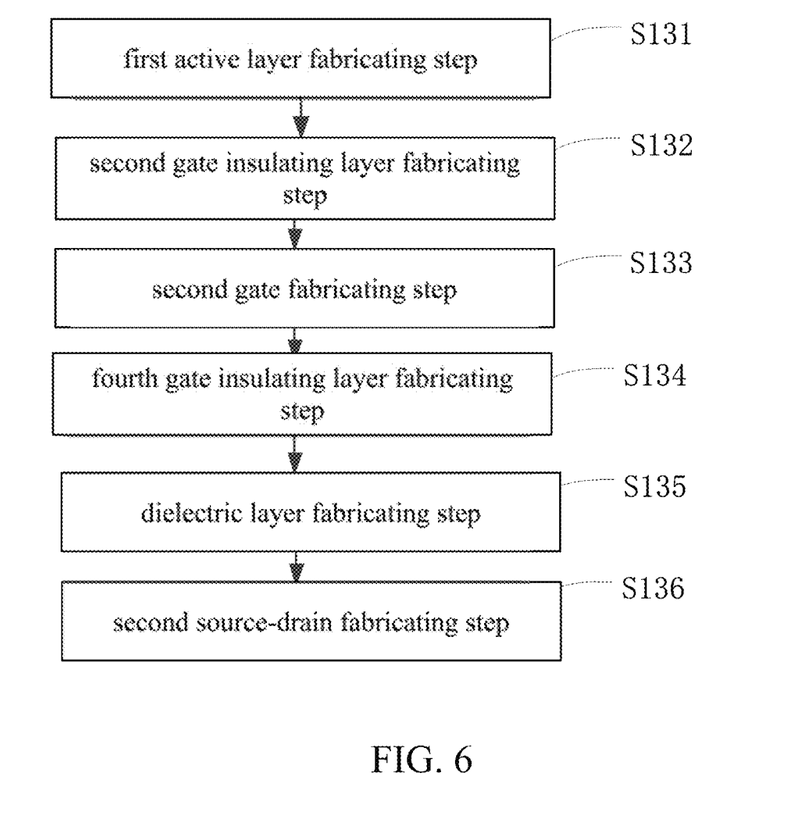
FIG. 6 is a flowchart showing fabricating steps of a first thin film transistor layer according to the embodiment of the present invention.

A first thin film transistor layer fabricating step of S13, fabricating a thin film transistor layer on the upper surface of the buffer layer. As shown in FIG. 6, the first thin film transistor layer fabricating step includes the following steps S131 to S136. A first active layer fabricating step of S131, depositing a material such as P—Si, silicon oxide or the like on the buffer layer to form a second active layer. A second gate insulating layer fabricating step of S132, fabricating a third gate insulating layer on an upper surface of the first active layer. A second gate fabricating step of S133, forming a fourth gate electrode on the upper surface of the second gate insulating layer by a metal material, and a structure of the second gate can be a molybdenum-aluminum-molybdenum structure, but is not limited to other structures. A second gate insulating layer fabricating step of S134, fabricating a fourth gate insulating layer on the upper surface of the second gate. A dielectric layer fabricating step of S135, fabricating a dielectric layer on an upper surface of the fourth gate insulating layer. A second source-drain fabricating step of S136, forming the first via holes in the dielectric layer and the fourth gate insulating layer, the via holes penetrate to the second active layer, and then depositing a metal material to form the second source-drain such that the second source-drain is connected to the second active layer.

A touch electrode fabricating step of S14, fabricating the touch electrode on the upper surface of the first thin film transistor layer.

It should be noted that, in this embodiment, the step of fabricating the touch electrode and the step of fabricating the second source-drain can simultaneously deposit a metal material to form the second source-drain and the touch electrode, respectively, thereby improving efficiency of the process and a thickness of the display device.

A pixel definition layer fabricating step of S15, fabricating the pixel definition layer on the first thin film transistor layer and the upper surface of the touch electrode, wherein the pixel definition layer is divided into a plurality of color sub-pixel regions, and the color sub-pixel regions can include red sub-pixel regions, green sub-pixel regions or blue sub-pixel regions.

A second planarization layer fabricating step of S16, fabricating the second planarization layer on the upper surface of the pixel definition layer.

A common electrode fabricating step of S17, fabricating the common electrode on the upper surface of the second planarization layer, wherein the second planarization layer and the pixel definition layer are provided with second through holes, and the common electrode is electrically connected to the touch electrode through the second through holes.

A second passivation layer fabricating step of S18, fabricating the second passivation layer on the upper surface of the common electrode.

A pixel electrode fabricating step of S19, fabricating the pixel electrode on the upper surface of the second passivation layer, via holes penetrating through the second passivation layer, the second planarization layer, and the pixel definition layer, and positions of the via holes correspond to positions of the second source-drain.

Figure 7:
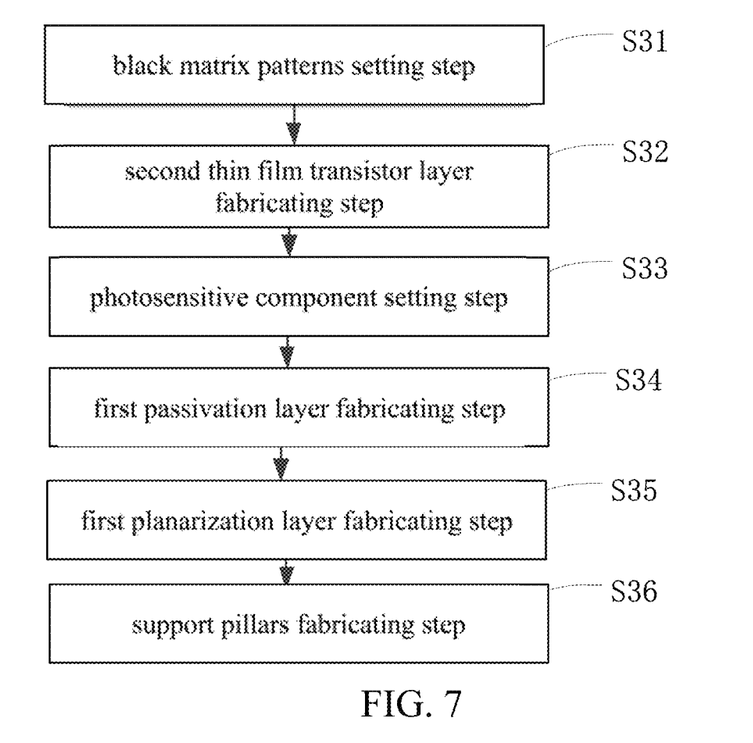
FIG. 7 is a flowchart showing steps of setting the counter substrate according to the embodiment of the present invention.

As shown in FIG. 7, the counter substrate setting step includes the following steps S31 to S36.

A black matrix patterns setting step of S31, disposing the black matrix patterns on the upper surface of the second substrate.

Figure 8:
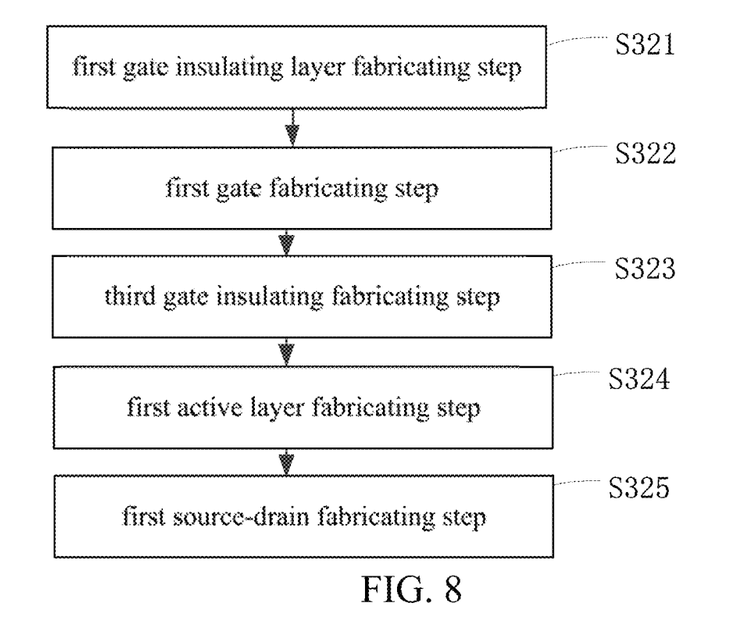
FIG. 8 is a flowchart showing fabricating steps of a second thin film transistor layer according to the embodiment of the present invention.

A second thin film transistor layer fabricating step of S32, fabricating the second thin film transistor layer on the black matrix patterns and the upper surface of the first substrate. As shown in FIG. 8, the second thin film transistor layer fabricating step includes the following steps S321 to S325. A first gate insulating layer fabricating step of S321, fabricating the first gate insulating layer on the black matrix patterns and the upper surface of the first substrate. A first gate fabricating step of S322, fabricating the first gate on the upper surface of the first gate insulating layer. A second gate insulating layer fabricating step of S323, fabricating the second gate insulating layer on the upper surface of the first gate. A first active layer fabricating step of S324, fabricating the first active layer on the upper surface of the second gate insulating layer, wherein the first active layer is made of IGZO, but is not limited to other materials. A first source-drain fabricating step of S325, fabricating the first source-drain on the upper surface of the first active layer.

A photosensitive component setting step of S33, disposing the photosensitive component on the upper surface of the second thin film transistor layer. The photosensitive component setting step sequentially includes a cathode fabricating step, a photosensitive device setting step, a hole transport layer fabricating step, and an anode fabricating step. In the cathode fabricating step, the cathode is fabricated on the upper surface of the second thin film transistor layer. In the electron transport layer fabricating step, the electron transport layer is fabricated on the upper surface of the cathode. In the photosensitive layer fabricating step, the photosensitive device is disposed on an upper surface of the electron transport layer. In the hole transport layer fabricating step, the hole transport layer is fabricated on an upper surface of the photosensitive device. In the anode fabricating step, the anode is fabricated on an upper surface of the hole transport layer, and the anode is connected to the second source-drain.

A first passivation layer fabricating step of S34, fabricating the first passivation layer on the first active layer, the first source-drain, and the upper surface of the cathode.

A first planarization layer fabricating step of S35, fabricating the first planarization layer on the thin film transistor layer and the upper surface of the cathode.

A support pillars fabricating step of S36, fabricating support pillars on the upper surface of the first planarization layer.

In the technical solution of the method of fabricating the display panel provided by the embodiment, the step of fabricating the display substrate and the step of fabricating the counter substrate can be performed simultaneously to save the manufacturing time of the process. In addition, the liquid crystal layer is fabricated on the upper surface of the display substrate, and then is bonded to the counter substrate to form a display panel, wherein the support pillars in the counter substrate are used to support the liquid crystal molecules in the liquid crystal layer, thereby ensuring uniform distribution of liquid crystal molecules in the liquid crystal layer.

The display panel and the fabricating method thereof provided by the embodiment adopt a color filter on array process on the display substrate, which can solve the problem that the liquid crystal display product has difficulty in integrating the in-cell fingerprint sensing array and increase the aperture ratio of the display panel. The photosensitive component is disposed on the light-emitting surface of the counter substrate, the distance between the photosensitive component and the finger fingerprint can be shortened, the path of the light can be shortened, and the loss of the reflected light of the fingerprint can be reduced. Thereby improving the sensitivity of fingerprint recognition of the display panel and realizing the fingerprint identification under the in-cell screen of the liquid crystal display panel.

The embodiment provides a display device including the display panel described above. The display device can be any product or component having display function such as electronic paper, mobile phone, tablet computer, television, display, notebook computer, digital photo frame, navigator, and the like. The display device can provide a better unlocking experience for people by using a better fingerprint recognition effect to identify the user.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display panel, comprising:
    a display substrate;
    a counter substrate disposed opposite to the display substrate; and
    a backlight comprising a detecting light source disposed under the display substrate;
    wherein the display substrate comprises:
        a first thin film transistor layer having a plurality of thin film transistors;
        a touch electrode disposed on a surface of a side of the first thin film transistor layer; and
        a pixel definition layer disposed on a surface of the touch electrode and on the surface of the first thin film transistor layer, wherein the pixel definition layer comprises a plurality of pixel regions, and each of the pixel regions is correspondingly disposed on one of the plurality of thin film transistors; and
    the counter substrate comprises:
        a second thin film transistor layer having a plurality of thin film transistors; and
        a photosensitive component connected to an underside of the second thin film transistor layer;
        wherein the photosensitive component is configured to receive a reflected light of a fingerprint of a user to identify an identification of the user.

2. The display panel according to claim 1, wherein the photosensitive component comprises:
    a cathode disposed on a surface of a side of the second thin film transistor layer;
    an electron transport layer disposed on a surface of a side of the cathode away from the second thin film transistor layer;
    a photosensitive layer disposed on a surface of a side of the electron transport layer away from the second thin film transistor layer;
    a hole transport layer disposed on a surface of a side of the photosensitive layer away from the second thin film transistor layer; and
    an anode disposed on a surface of a side of the hole transport layer away from the second thin film transistor layer.

3. The display panel according to claim 1, wherein the second thin film transistor layer comprises a first gate insulating layer, a first gate, a second gate insulating layer, a first active layer, and a first source-drain laminated in a stack;
    wherein the photosensitive layer in the photosensitive component is connected to a side of the anode through the hole transport layer, and the first source-drain is connected to the other side of the anode; and
    wherein the photosensitive layer in the photosensitive component is connected to the cathode through the electron transport layer.

4. The display panel according to claim 1, wherein the counter substrate further comprises:
    a first substrate;
    black matrix patterns disposed on a surface of a side of the first substrate;
    a first passivation layer disposed on a surface of a side of the second thin film transistor layer away from the first substrate; and
    a first planarization layer disposed on a surface of a side of the photosensitive component and on a surface of a side of the first passivation layer away from the first substrate;
    wherein the second thin film transistor layer is disposed on surfaces of sides of the black matrix patterns and on the surface of the side of the first substrate.

5. The display panel according to claim 1, wherein a detection light is emitted from the detecting light source, irradiating onto the fingerprint of the user through the display panel, and reflected by the fingerprint to form a reflected light when the user touches the display panel; and the photosensitive component acquires the reflected light, and recognizes a pattern of the fingerprint of the user according to intensity differences of the reflected light.

6. The display panel according to claim 1, wherein the display panel further comprises a liquid crystal layer disposed between the display substrate and the counter substrate;
    wherein the first thin film transistor layer is configured to provide a driving voltage for the liquid crystal layer; and wherein the second thin film transistor layer is configured to provide a driving current to the photosensitive component.

7. The display panel according to claim 1, wherein the display substrate further comprises:
- a second planarization layer disposed on a surface of a side of the pixel definition layer away from the first thin film transistor layer;
- a common electrode disposed on a surface of a side of the second planarization layer away from the first thin film transistor layer and connected to the touch electrode;
- a second passivation layer disposed on a surface of a side of the common electrode and the surface of the side of the second planarization layer away from the first thin film transistor layer;
- via holes penetrating through the second passivation layer, the second planarization layer, and the pixel definition layer, wherein positions of the via holes correspond to positions of a second source-drain; and
- a pixel electrode filled in the via holes and connected to the second source-drain.

8. The display panel according to claim 1, wherein the first thin film transistor layer comprises a second active layer, a third gate insulating layer, a third gate, a third gate insulating layer, a dielectric layer, and a second source-drain laminated in a stack.

9. The display panel according to claim 1, wherein the display substrate further comprises:
- a second substrate;
- light-shielding patterns disposed on a surface of a side of the second substrate; and
- a buffer layer disposed on surfaces of sides of the light-shielding patterns and the surface of the side of the second substrate;
- wherein the first thin film transistor layer is disposed on a surface of a side of the buffer layer away from the second substrate.

10. A display device comprising the display panel according to claim 1.

* * * * *